United States Patent
Edwards et al.

[15] 3,646,741
[45] Mar. 7, 1972

[54] FRUIT HARVESTING APPARATUS

[72] Inventors: John W. Edwards, 208 Riverside Drive; John W. Eason, Jr., 206 Riverside Drive; Adrian R. Chapman, Route One Herd Bridge Road; Emerson M. Clavel, 900 W. Palmetto Street, all of, Wauchula, Fla. 33873

[22] Filed: Feb. 13, 1970

[21] Appl. No.: 11,277

Related U.S. Application Data

[63] Continuation-in-part of Ser. No. 860,329, Sept. 23, 1969, abandoned.

[52] U.S. Cl. ................................................56/328 R
[51] Int. Cl. ..............................................A01g 19/00
[58] Field of Search .................................56/328 R

[56] References Cited

UNITED STATES PATENTS

| | | | |
|---|---|---|---|
| 3,404,521 | 10/1968 | Thorn et al. | 56/328 R |
| 3,413,787 | 12/1968 | Van Antwerp et al. | 56/328 R |
| 3,427,796 | 2/1969 | McCray et al. | 56/328 R |
| 3,451,202 | 6/1969 | Murray | 56/328 R |
| 3,452,528 | 7/1969 | Fairchild et al. | 56/328 R |
| 3,531,924 | 10/1970 | Stine | 56/328 R |

FOREIGN PATENTS OR APPLICATIONS

| | | | |
|---|---|---|---|
| 1,151,973 | 3/1960 | Germany | 56/328 R |

*Primary Examiner*—Louis C. Mancene
*Assistant Examiner*—J. A. Oliff
*Attorney*—Morton, Bernard, Brown, Roberts & Sutherland

[57] ABSTRACT

A crop harvesting apparatus particularly suited for the picking of tree-borne crops such as fruit and nuts. An elongated hollow cylindrical shell has a plurality of openings for the entry of fruit. Each opening terminates in a stem severing edge. The shell is thrust among the crops to be harvested and is rotated, removing the crops from the plants. An internal auger urges the fruit to a discharge from which it moves to a suitable storage location. Means are provided to prevent mature ripened fruit from leaving the shell except through the discharge and to permit immature green fruit to pass out the openings without being severed from the plant.

11 Claims, 10 Drawing Figures

PATENTED MAR 7 1972
3,646,741
SHEET 1 OF 3
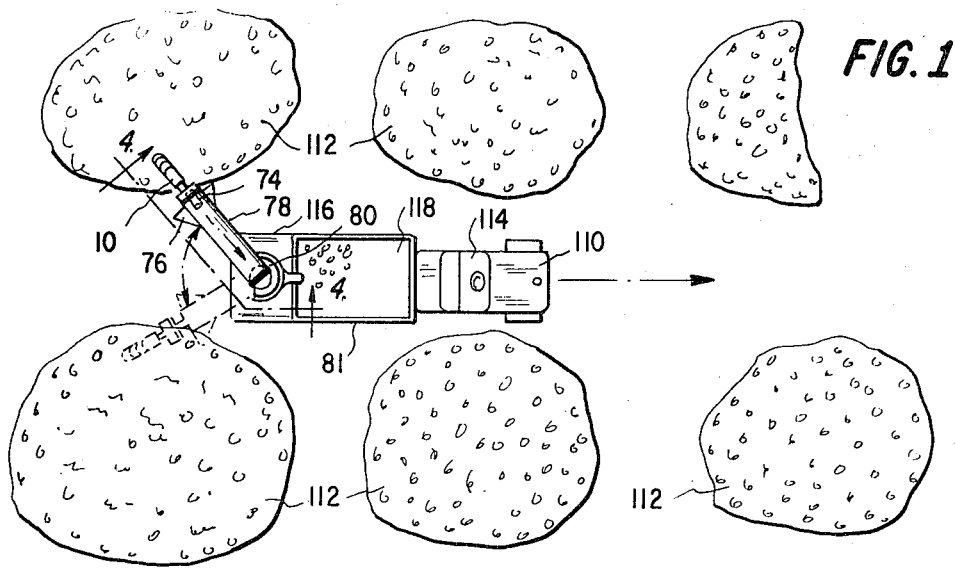
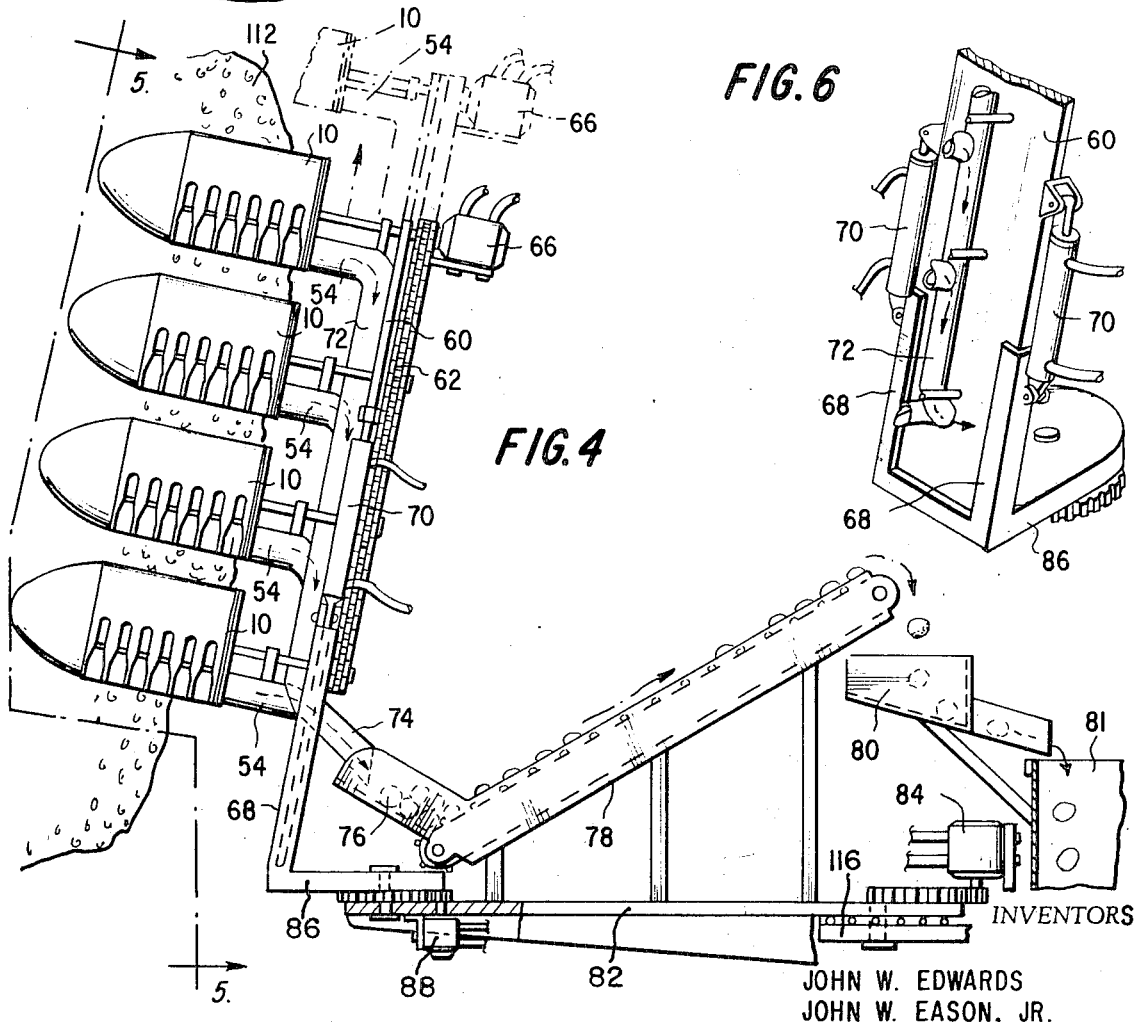
INVENTORS
JOHN W. EDWARDS
JOHN W. EASON, JR.
ADRIAN R. CHAPMAN
EMERSON M. CLAVEL
BY McLean, Morton & Baustead
ATTORNEYS

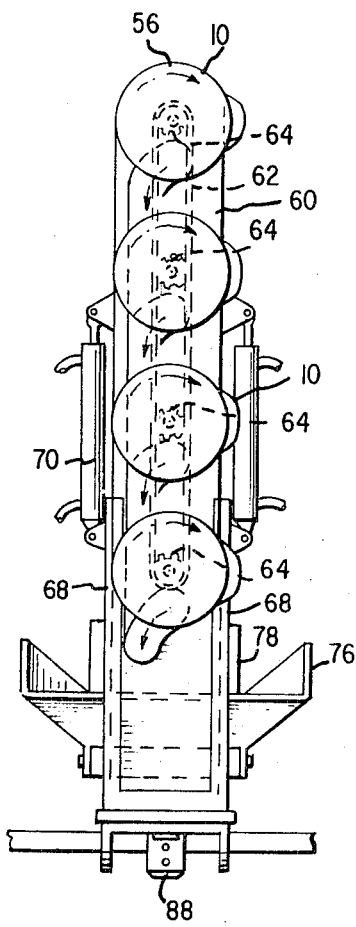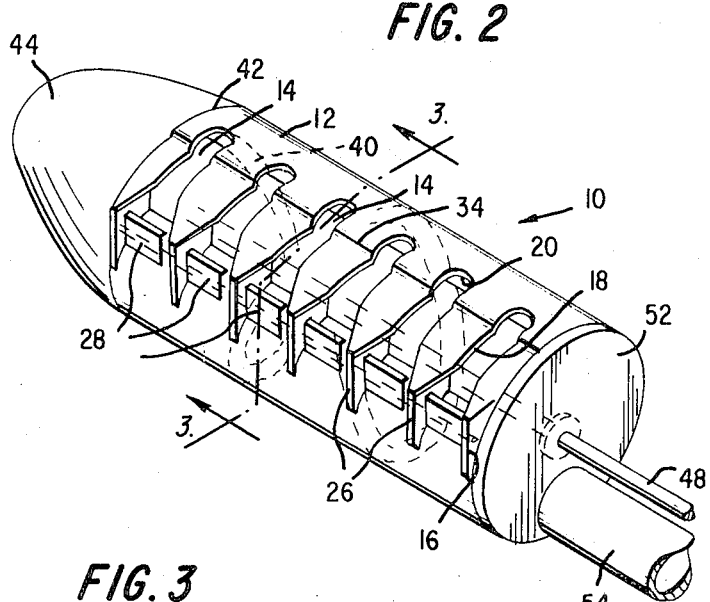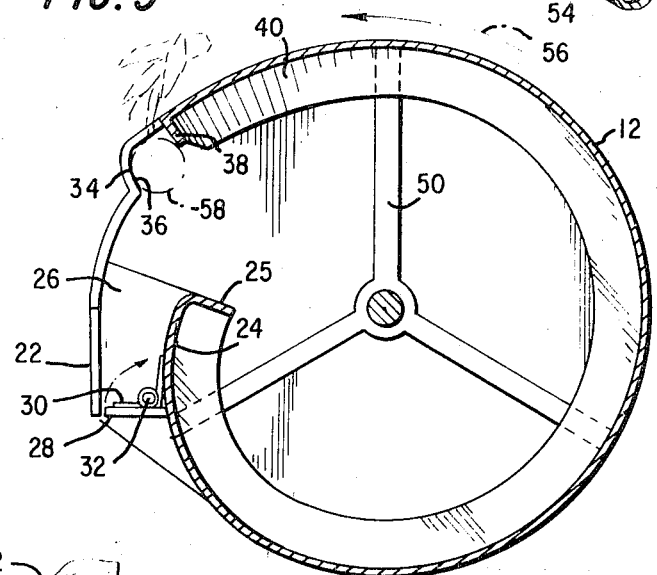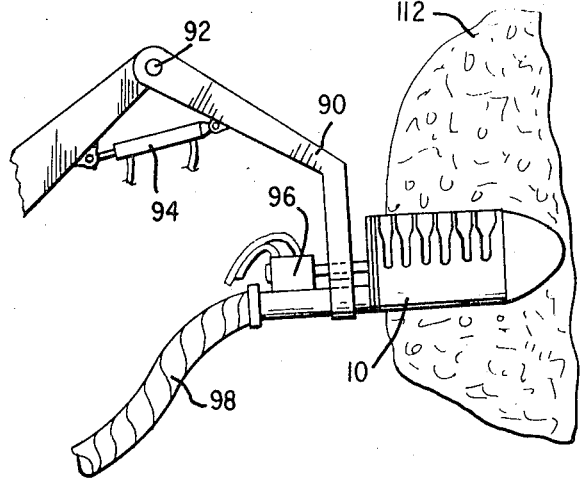

PATENTED MAR 7 1972

INVENTORS
JOHN W. EDWARDS
JOHN W. EASON, JR.
ADRIAN R. CHAPMAN &
EMERSON M. CLAVEL

BY McLean, Morton + Boustead
ATTORNEYS

FRUIT HARVESTING APPARATUS

This application is a continuation-in-part of U.S. Pat. application Ser. No. 860,329, filed Sept. 23, 1969 now abandoned.

The present invention pertains to a crop harvesting apparatus. More particularly, the present invention pertains to an apparatus for the harvesting of crops and in particular tree-borne crops such as fruit, nuts and the like.

At the present time may tree-borne crops such as fruit are harvested by hand. While attempts have been made to perfect mechanized fruit picking apparatus, these have not been successful heretofore. Such apparatus either have caused damage to the fruit-bearing tree or to the fruit itself, or they have been unable to pick fruit with great enough efficiency to be economically successful. The fruit trees must not be damaged to any extent during the harvesting of the fruit or the tree will yield less fruit in subsequent crops. Thus, mechanized fruit picking apparatus must be capable of removing the fruit from the tree without removing leaves and branches, not only to prevent damage to the tree but also to ensure that the output of the fruit picker does not include such branches and leaves. Likewise, the fruit itself must not be damaged to any great extent if it is to be marketable. While fruit which is intended for processing need not be in perfect condition, still it cannot be damaged excessively or it will be unsuited even for processing. Accordingly, the fruit picking must be done without excessive damage to the crop. Citrus fruit of the Valencia variety must stay on the tree for over a year to ripen. As a consequence, at the time the fruit is to be picked, the Valencia tree is bearing both unripened or green fruit of the new crop and ripened fruit of the crop to be harvested. An automatic crop harvesting apparatus must be capable of picking the ripened Valencia fruit while rejecting the unripened fruit. No automatic apparatus has been available heretofore which is capable of distinguishing between the mature ripened fruit and the green unripened fruit.

The present invention is a crop harvesting apparatus particularly suited for the picking of tree-borne fruit and in addition capable of selectively picking only ripened Valencia citrus fruit from a tree having both mature or ripened Valencia fruit and a new crop of green Valencia fruit on it. In accordance with the present invention, a crop harvesting apparatus is provided in the form of a rotating hollow cylindrical picking head with a plurality of openings therein for the entry of fruit. Each opening includes a fruit entry area and a fruit passage area terminating in a fruit removal edge. The fruit passage area is of a size which prevents mature fruit within the rotating picking head from passing out therethrough, while allowing the smaller immature or green fruit to do so. Consequently, in the harvesting of fruit such as Valencia citrus fruit which might have mature fruit to be harvested and a new growth of green fruit on the same tree at the same time, the mature fruit is maintained within the picking head to be removed from the tree thereby, while the green fruit, being of a smaller size, passes out the fruit passage area. The openings can be provided in the picking head either in a straight line or spiraled about the head.

In the harvesting of fruit utilizing the present invention, a vehicle transporting the crop harvesting apparatus is moved through the field. Preferably, the apparatus is mounted on the vehicle in a manner which permits vertical and horizontal movement of the picking head relative to the vehicle so that the picking head can be inserted into and removed from the fruit trees as desired. The picking head is rotated, and when mature fruit is contacted, the mature fruit enters the fruit entry area of an opening, traverses the fruit passage area, and is severed from the tree by the fruit removal edge. The fruit then passes out of the picking head and moves to a suitable storage area which, for example, might be a storage bin on the same vehicle as is transporting the crop harvesting apparatus.

These and other aspects and advantages of the present invention are more apparent in the following detailed description and claims, particularly when read in conjunction with the accompanying drawings in which like parts bear like reference numerals.

In the drawings:

FIG. 1 is a schematic plan view depicting the harvesting of fruit utilizing the present invention;

FIG. 2 is a perspective view of one embodiment of crop harvesting apparatus in accordance with the present invention;

FIG. 3 is a sectional view taken along line 3—3 of FIG. 2;

FIG. 4 is a fragmentary elevational view of a crop harvesting apparatus in accordance with the present invention and an appropriate transporting device, and is taken along line 4—4 of FIG. 1;

FIG. 5 is an elevational view of the crop harvesting apparatus of the present invention and is taken along line 5—5 of FIG. 4;

FIG. 6 is a fragmentary elevational view showing details of the transporting device depicted in FIG. 4;

FIG. 7 is a fragmentary elevational view of a crop harvesting apparatus in accordance with the present invention and depicting a second form of suitable transporting device;

Figure 8:
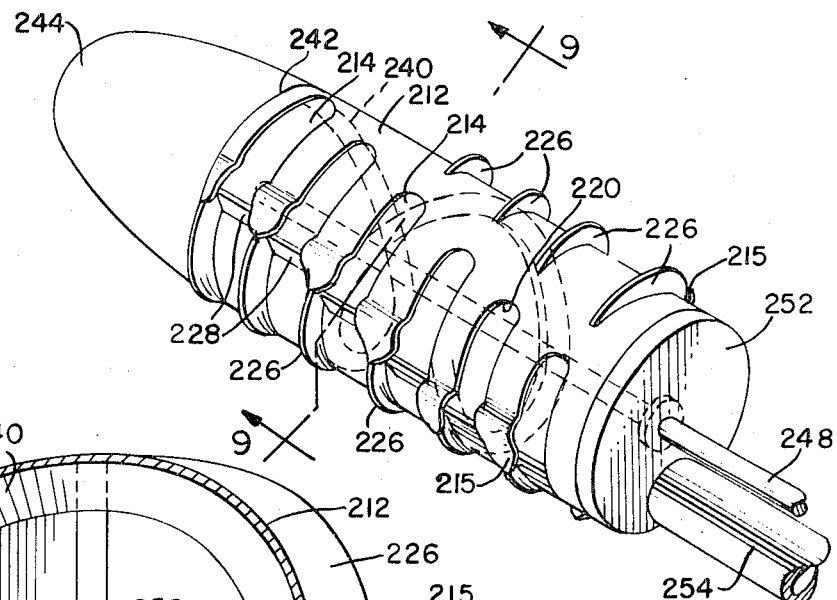
FIG. 8 is a perspective view of a second embodiment of crop harvesting apparatus in accordance with the present invention.

As depicted in FIG. 1, vehicle 110, which transports the crop harvesting apparatus of the present invention, is driven through a field of crops to be harvested which in FIG. 1 is illustratively depicted as a grove of citrus fruit trees. By the way of example, the trees 112 in a citrus grove might be spaced at distances in the order of 15 feet from center to center in the direction in which vehicle 110 moves (horizontally in FIG. 1) and at a distance in the order of 30 feet from center to center in the transverse direction (vertically in FIG. 1). In addition to the front portion 114 of vehicle 110 which includes the engine and the operators cab, the vehicle has a rear platform 116 upon which is supported the crop harvesting apparatus of the present invention and a center portion 118 which preferably supports a crop storage container.

In the embodiment of the present invention depicted in FIGS. 2 and 3, crop harvesting apparatus 10 is made up of an elongated hollow cylindrical shell 12 having a plurality of openings 14 in its surface to permit fruit to enter and to be removed from the tree. Each opening 14 of this embodiment includes an enlarged fruit entry area 16 and a more narrow fruit passage area 18 and terminates in a fruit severing edge 20. As seen in FIG. 3, shell 12 might be formed by rolling a sheet of metal in an approximate G shape with outer lip 22 overlapping inner lip 24. The inner edge of lip 24 is bent inwardly to form surface 25 which insures that fruit cannot roll out openings 14 as shell 12 rotates. Metal plates 26 are attached to lips 22 and 24 to separate the several openings 14. The outer lip 22 is shaped to form the narrowing fruit entry areas 16 and the fruit passage areas 18 with the fruit removal edges 20. If desired, fruit severing edges 20 can be sharpened to aid in the cutting of the fruit stem.

A closure plate 28 can be provided at each fruit opening 14 with biasing means such as springs 30 to permit movement of the plate in a direction allowing entry of fruit through openings 14 into picking head 10, but preventing passage of the fruit out from head 10 through openings 14. The springs 30 for the several plates 28 might be supported on a single rod 32 extending through each member 26.

In the embodiment of the present invention depicted in FIGS. 2 and 3, shell 12 includes depression 34 intermediate the ends of fruit passage area 18, forming a hill 36 on the inner surface of shell 12. A plate 38 extends longitudinally within shell 12 behind each fruit severing edge 20 and, for example, might be spaced about one-fourth inch behind edges 20 and might extend about 1 inch inwardly from shell 12. On the inner surface of shell 12 an auger 40 is mounted to cause fruit within the shell to move longitudinally as shell 12 is rotated.

The forward end of shell 12 is closed by plate 42. Preferably, the forward end of the picking head 10 includes a cone 44 mounted to forward plate 42 and shaped to ease entry of the crop harvesting apparatus into a tree or other plant. The shell 12 is supported on drive rod 48, for example, by means of spider 50. Mounting plate 52 is located at the rear of shell 12. Drive rod 48 passes through mounting plate 52, and plate 52 does not rotate with shell 12. Plate 52 includes an opening to which is attached discharge pipe 54 through which the fruit passes from shell 12. If desired, this rear end of picking head 10 can include a sloped shroud behind plate 52 to ease the withdrawal of head 10 from trees.

To harvest tree-borne crops, harvesting aid 10 is inserted into the tree and rotated as indicated by arrow 56 in FIG. 3. Fruit entering openings 14 depresses closure plates 28 and passes through the fruit entry area 16. As depicted in FIG. 3, the fruit 58 catches behind hill 36 with the fruit stem passing out area 18 adjacent fruit severing edge 20. In addition, hill 36 prevents the fruit from bouncing off plate 38 and exiting through opening 16 before plate 28 has blocked the opening. Plate 38 tips the fruit slightly so that with continued rotation of picking head 10 the fruit stem is severed close to the body of the fruit. Should undersized fruit enter shell 12, for example, immature Valencia citrus fruit, when that fruit contacts plate 38 it is pushed outwardly over hill 36 to pass out through fruit passage area 18 without severing from the tree. In like manner, small leaves and twigs are not severed by the crop harvesting aid. The fruit which is removed from the tree falls to the bottom of picking head 10. Since head 10 rotates at a low speed, for example, a speed in order of 30 revolutions per minute, the fruit remains at the bottom of head 10 as the head rotates. Consequently, auger 40 drives the fruit toward discharge pipe 54 during this rotation. Discharge pipe 54 conveys the fruit to a suitable receptacle.

The fruit picking apparatus 10 might be mounted on any suitable device for movement through the field or grove. As the device moves about each tree, the apparatus 10 is rotated to cause it to contact and sever fruit from the tree. By way of example, FIGS. 4, 5 and 6 depict means for mounting a plurality of crop picking heads 10 upon suitable transporting means such as a flat bed truck. Each picking head 10 is rotatably mounted by its drive rod 48 to plate 60. As seen in FIGS. 4 and 5 drive means such as chain 62 and sprockets 64 are provided to rotatably drive each picking head 10. Means such as a hydraulic motor 66 provides the driving power to chain 62. Plate 60 is slidably mounted within channels 68, and suitable means such as hydraulic lifters 70 are provided to permit the raising of plate 60 so that the fruit picking apparatus 10 can be raised to the desired height, as depicted by the broken outline in FIG. 4.

The discharge tube 54 from each picking head 10 connects to discharge pipe 72 which preferably is slightly offset around drive shafts 48 and which empties into outlet 74. Pipe 72 and outlet 74 move with plate 60. The fruit passing from each picking head 10 moves through discharge outlets 54, passes downwardly through pipe 72, and is discharged from outlet 74 into receiver 76. Preferably, the picking heads 10 and discharge outlets 54 are slightly inclined, as depicted in FIG. 4, so that the fruit moves under the force of gravity, in addition to the urging of auger 40. Endless conveyor 78 picks up the fruit from receiver 76 and lifts it as depicted in FIG. 4. The fruit passes from the discharge end of conveyor 78 into tray 80 from which it moves to a suitable storage bin 81 located at center portion 118 of vehicle 110. Endless conveyor 78 is mounted on platform 82 which in turn is rotatably mounted on rear platform 116 of vehicle 110. Illustratively, as depicted in FIG. 4, means such as hydraulic motor 84 and suitable gearing are provided to rotate platform 82 on rear platform 116. In addition, support 86 to which channels 68 are connected, is rotatably mounted on platform 82, and means such as hydraulic motor 88 and suitable gearing are provided to rotate support 86 on platform 82. A further hydraulic motor (not shown) is provided to power endless conveyor 78. The several hydraulic motors and hydraulic lifters derive their power from the hydraulic system of vehicle 110. If desired, channels 68 can be hingedly connected to support 86 to permit the angle of inclination of plate 60 to be changed, and support 86 can be designed to telescope horizontally to extend the picking heads 10 further into the trees. Receiver 76 preferably angles outwardly, as best seen in FIG. 1, to remain beneath outlet 74 as support 86 rotates. Likewise, as seen in FIG. 1, tray 80 is shaped to remain beneath the discharge end of conveyor 78 as platform 82 rotates, and preferably the lower surface of tray 80 is sloped so that the fruit rolls into storage bin 81.

The picking heads 10 are of a size dependent upon the crop to be harvested. For the harvesting of oranges and apples, a picking head 10 having a cylinder 12 with a length in the order of 36 inches to 60 inches and a diameter in the order of 20 inches might be suitable. With such an apparatus six to ten openings 14 can be provided, with the fruit entry areas 16 having a width in the order of 6 inches and a length in the order of 4 inches, and with the fruit passage areas having a width in the order of 2 inches and a length in the order of 6 inches. Likewise, the discharge pipes 54 might have a diameter in the order of 8 inches and a length in the order of 16 inches, while pipe 72 has a diameter in the order of 12 inches. For crops of other sizes, of course, different dimensions would be required, with the larger crops such as grapefruit requiring larger dimensions and the smaller crops such as plums or nuts requiring smaller dimensions. Preferably, the picking heads 10 are removably mounted to drive shafts 48 to permit attachment of different size heads for the harvesting of different size crops.

FIG. 7 illustrates the utilization of a single picking head 10 for smaller scale operations. As there depicted, the picking head 10 is supported on arm 90 which is hinged at junction 92 and includes hydraulic cylinder 94 to permit movement of arm 90 about junction 92. Hydraulic motor 96 rotates apparatus 10, and discharge outlet 54 connects to tubing 98 which conveys the fruit to the desired receptacle.

Figure 9:
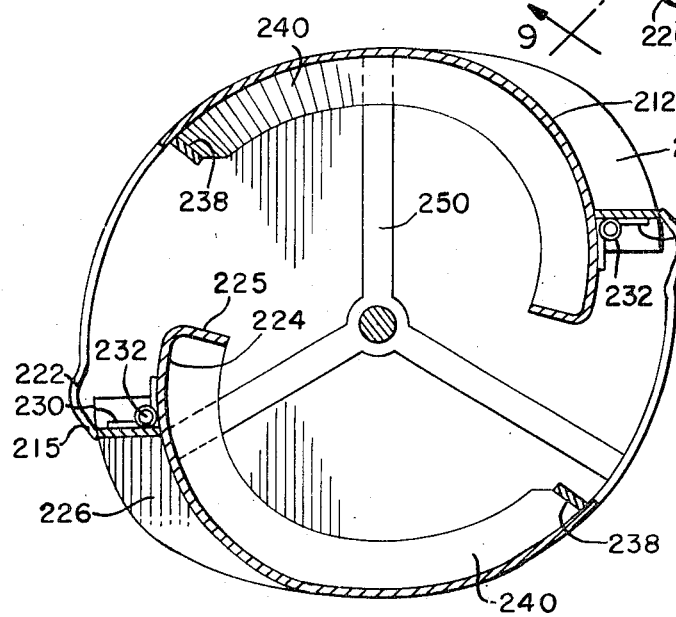
FIG. 9 is a sectional view taken along line 9—9 of FIG. 8.

FIGS. 8 and 9 depict a second embodiment of crop harvesting apparatus 210 in which the elongated hollow cylindrical shell 212 includes two sets of openings 214 each of which extends over the length of shell 212 in a spiral. By way of example, a harvesting apparatus 210 with a length in the order of 36 inches, might include six openings 214 in each of two groups substantially 180° apart around the surface of shell 212, and in each group the rearmost opening 214 might be offset with respect to the forwardmost opening in the order of 6 inches to 12 inches. Each opening 214 has a substantially constant width in the order of 2 inches. The outer end of each opening 214 includes a smooth curve, meeting the curve of the adjacent opening to form tips 215 which preferably are bent slightly outwardly from the body of shell 212, as seen in FIG. 9, to ease the entry of fruit into the fruit entry openings.

The adjacent openings 214 are separated by plates 226 which extend from a point just within tips 215 outward along the outer surface of shell 212 as depicted in FIG. 9. The openings 214 preferably have a minimum length in the order of 8 inches to ensure that the fruit is fully within crop harvesting apparatus 210 before contacting fruit severing edge 220.

Similar to crop harvesting apparatus 10, the crop harvesting apparatus 210 is formed in an approximate G shape, with outer lip 222 overlapping inner lip 224 which is bent inwardly to form surface 225 to ensure that fruit does not roll out openings 214 as shell 212 rotates. A closure plate 228 is preferably provided at each opening 214 and is biased to close the openings 214 by means such as springs 230 mounted on rod 232. About one-fourth inch behind the fruit severing edges 220, plate 238 extends longitudinally within shell 212 and might extend about 1 inch inwardly from shell 212. Auger 240 is mounted on the inner surface of shell 212 to cause fruit within the shell to move longitudinally as shell 212 is rotated. Auger 240 can be bent around openings 214 so that the auger is one continuous piece, as depicted in FIG. 8, or alternatively the auger 240 can be provided in segments, as depicted in FIG. 9. The forward end of shell 212 is closed by plate 242 which is secured to the shell by means of spider 250. Preferably, the forward end of picking head 210 includes cone 244 to ease entry into a tree. Shell 212 is mounted on drive rod 248 which rotates the shell during operation. The rear end of shell 212 is closed by plate 252 which does not rotate and which includes an opening to which is attached discharge pipe 254 through which the fruit passes from shell 212.

Picking head 210 is utilized in the same manner as picking head 10. When picking head 210 is inserted into a fruit-bearing tree and rotated, fruit enters the openings 214 and is removed from the tree by severing edge 220. Since the openings 214 are spiralled, only one fruit is being severed from the tree at any one time, and consequently the pressure on the tree limb is kept at a low level, thereby ensuring that the limb is not damaged. Should a fruit contact an opening 214 too late to enter therein and be removed from the tree, it passes into the corresponding opening 214 on the opposite side of picking head 210.

Figure 10:
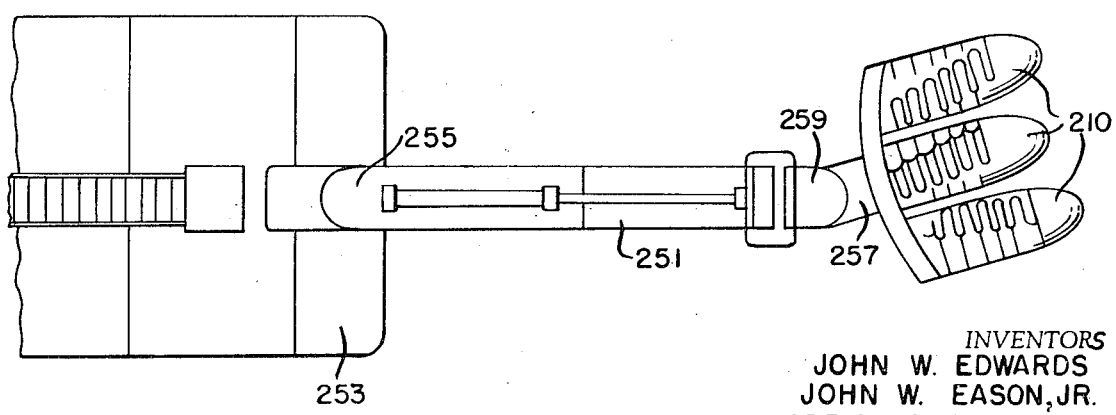
FIG. 10 is a fragmentary schematic plan view further illustrating use of the present invention.

FIG. 10 depicts three picking heads 210 mounted in a substantially horizontal plane on the end of arm 251 which extends from platform 253 at the rear of a vehicle such as truck 110. Preferably, arm 251 is rotatable about vertical axis 255 and is extendable in a horizontal direction, and preferably outer end 257 of arm 251 is rotatable about a vertical axis 259, thereby permitting operation of picking heads 210 in all trees as the transporting vehicle passes through the fruit grove. Thus, for example, arm 251 can be adjusted to insert the picking heads 210 into the lower branches of the fruit trees, and then arm 251 can raise the picking heads 210 as the heads rotate, thereby moving the heads 210 vertically through the trees and removing the fruit, while ensuring that the tree limbs are not damaged. Preferably, as depicted in FIG. 10, one of the picking heads 210 has its openings 214 facing the direction opposite that in which the openings of at least one of the other heads face, with the direction of rotation of the heads dependent upon the direction of the openings 214. Once the fruit is removed from the trees, it passes through a discharge pipe beneath arm 251 to a suitable receptacle.

The present invention is thus capable of assuming a number of embodiments of which representative illustration have been described. Numerous alterations and rearrangements might be made and still be within the scope of the invention.

What is claimed is:

1. A crop harvesting apparatus comprising a rotatable drive shaft; an elongated, hollow, substantially cylindrical shell connected to the drive shaft for rotation therewith about the shell longitudinal axis, the shell having a sidewall with a plurality of crop openings therein, each crop opening including a crop entry portion and a crop passage portion and terminating in a crop severing edge; closure means for closing each crop entry portion; and biasing means for urging the closure means to close the crop entry portions to prevent discharge of crops out the crop openings from within the hollow cylindrical shell while permitting movement of the closure means under pressure from crops to allow entry of crops into the hollow cylindrical shell.

2. A crop harvesting apparatus as claimed in claim 1 in which the hollow cylindrical shell sidewall has a depression forward of the crop severing edge of each crop opening to form a crop retaining hill adjacent the crop severing edges.

3. A crop harvesting apparatus as claimed in claim 1 in which the crop openings are aligned parallel to the hollow cylindrical shell longitudinal axis.

4. A crop harvesting apparatus as claimed in claim 1 in which each crop passage portion is more narrow than its respective crop entry portion.

5. A crop harvesting apparatus as claimed in claim 1 in which the crop openings are spiralled about the hollow cylindrical shell sidewall.

6. A crop harvesting apparatus as claimed in claim 1 further comprising auger means on the interior surface of the hollow cylindrical shell for urging crops within the cylindrical shell to move longitudinally therein as the cylindrical shell rotates about its longitudinal axis.

7. A crop harvesting apparatus as claimed in claim 6 further comprising plate means extending longitudinally on the interior surface of the cylindrical shell behind the crop openings to form a crop-tipping surface adjacent the crop severing edge of each crop opening.

8. A crop harvesting apparatus as claimed in claim 7 further comprising cone means connected to one end of the cylindrical shell for easing entry of the apparatus among the branches of a plant.

9. A crop harvesting apparatus as claimed in claim 8 further comprising plate means closing the second end of the cylindrical shell and having crop discharge means for discharging crops from the cylindrical shell interior to a crop receptacle.

10. A crop harvesting apparatus as claimed in claim 9 further comprising means for transporting the cylindrical shell, the transporting means including means for positioning the cylindrical shell among crops, and motor means for rotating the drive shaft.

11. A crop harvesting apparatus as claimed in claim 10 in which the transporting means is adapted to transport a plurality of the cylindrical shells.

* * * * *